B. J. OLSON.
FLOAT VALVE.
APPLICATION FILED MAY 16, 1919.
1,324,844.
Patented Dec. 16, 1919.
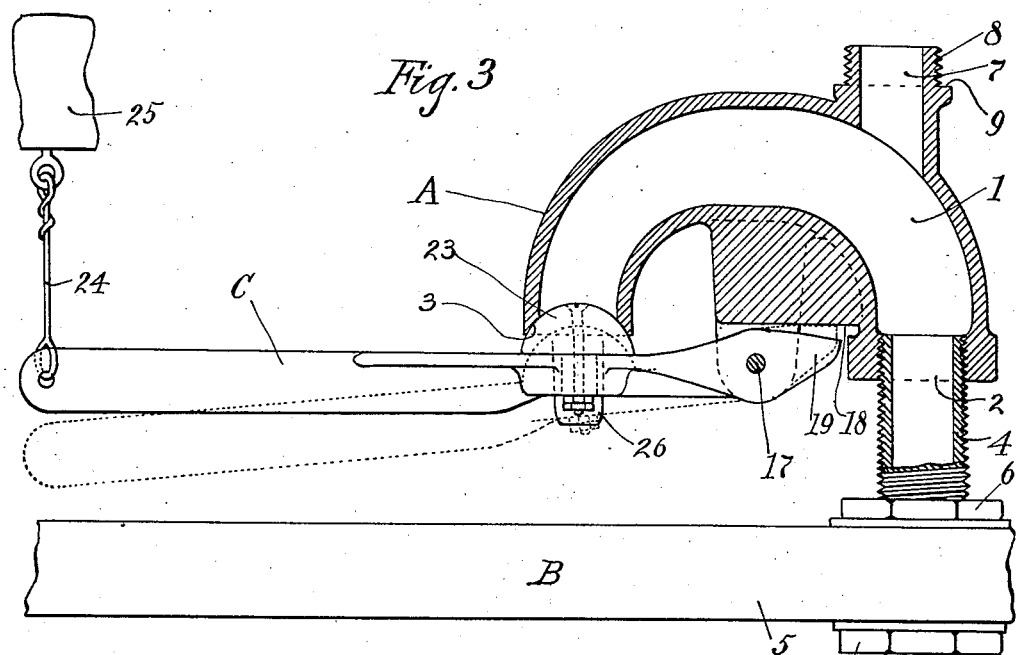
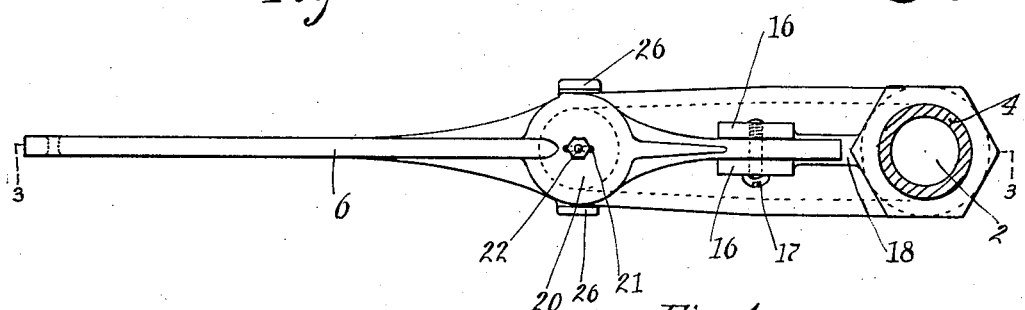
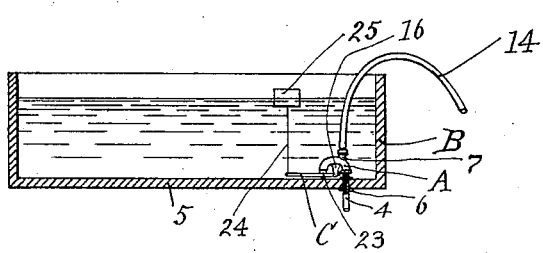
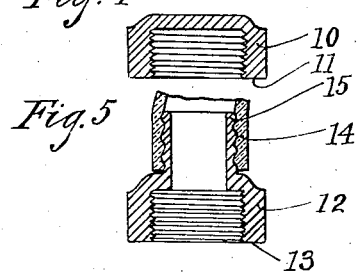
Inventor,
Ben J. Olson
by H. S. Johnson
his Attorney

UNITED STATES PATENT OFFICE.

BEN J. OLSON, OF WHALAN, MINNESOTA.

FLOAT-VALVE.

1,324,844.  Specification of Letters Patent.  Patented Dec. 16, 1919.

Application filed May 16, 1919. Serial No. 297,536.

*To all whom it may concern:*

Be it known that I, BEN J. OLSON, a citizen of the United States, residing at Whalan, in the county of Fillmore and State of Minnesota, have invented certain new and useful Improvements in Float-Valves, of which the following is a specification.

This invention relates to float valves for controlling water levels in reservoirs, such as watering troughs for live stock, etc., and has for its object to provide a device of this character that is of simple construction and strong and durable and which may be easily repaired. A further object of the invention is to provide a float valve having a branch adapted to detachably support an ordinary hose coupling in connection with a hose, beneath the water level, so that the leakage at the connection mingles with the water in the reservoir, thereby preventing the formation of objectionable pools near the reservoir, commonly the case when the hose connection is outside the reservoir or tank. The invention consists in the construction, combination and arrangement of parts hereinafter described and claimed.

In the accompanying drawings,

Figure 1, is a sectional elevation of a water tank equipped with the invention.

Fig. 2, is a plan view of a float valve embodying the invention, viewing the valve from below.

Fig. 3, is a sectional view on line 3—3 of Fig. 2.

Fig. 4, is a sectional view of a screw cap forming part of the float valve, and

Fig. 5, is a sectional view of a hose coupling to be used in connection with the float valve.

Referring to the drawings, A represents a one piece valve body or casing shaped like an inverted U, the interior of the casing forming a curved passage 1 of circular transverse section, and having two downwardly facing openings 2 and 3 which may be termed inlet and outlet openings respectively. The opening 2 has threaded connection with the nipple 4, which latter pierces the bottom 5 of the tank B, and leads to a source of water supply not shown. Suitable means, (such as the nuts 6, threaded on the nipple) is employed to render the tank proof against leaking. The casing is formed hexagonal at its inlet end so that it may be gripped with a wrench in making connection with the nipple. Opposite openings 2 and 3, and extending upwardly from the body of the valve is the branch 7 having external screw threads 8 and a shoulder 9. The cap 10 (Fig. 4) is adapted to be screwed over the branch to close it, the lower face 11 of the cap seating on the shoulder 9. Likewise, the hose coupling 12 (Fig. 5) fits over the threads 8, its lower face 13 also seating on the shoulder 9 to form a tight joint. A hose 14 is frictionally held positioned on the furrowed neck 15 of the coupling. When it is desired to detach the hose the coupling is removed and the cap 10 substituted. Between the downturned ends of the casing and approximately midway between them and integral with the casing are a pair of spaced downwardly extending lugs 16, pierced transversely by a pivot pin 17, the pivot pin being located a distance below the opening 3. Journaled on the pin between said lugs is a horizontal lever C, one end 19 thereof extending beyond said pin, away from the opening 3, said extension 19 being adapted to abut against a shoulder 18 on the casing, when the lever is rotated about said pin to a predetermined degree, as indicated in dotted lines in Fig. 3. The opposite end of the lever is comparatively long and extends directly under and a considerable distance beyond the opening 3. Directly under the opening 3 the lever is formed with a circular plate 20 having, centrally a slot 21 which receives loosely the bolt 22, which in turn pierces the semispherical rubber valve member 23 to bolt it firmly to the plate 20. The slot 21 permits the valve member to be moved laterally with respect to the outlet opening 3 so that it may be adjusted to bring it exactly central with said opening. The edge of the casing surrounding the opening is shown concaved to fit the surface of the valve member and constitutes a valve seat. It will be noted that the seat, in fact, forms the extreme outer end of the casing thereby rendering it conveniently accessible for the purpose of regrinding when it becomes pitted and leaky. While the drawing shows the seat concaved it may be beveled so that it will engage the valve member tangentially, the resiliency of the rubber forming a tight closure. Thus the seat may be restored with a common half round file removing the necessity of having special reseating tools on hand. Attached to the outer end of the lever as by means of a wire 24 is the float 25 adapted to float on the surface of the water in the tank. When the water level in the tank is low, the lever will fall by gravity to the position indicated in dotted lines in Fig. 3, the dotted lines showing the valve member unseated to admit a water supply from the casing. As the level of the water rises, the valve member approaches its seat and finally engages and exerts a pressure thereon to cut off the water supply. To guide the lever C, a pair of guide lugs 26, extend downwardly from the casing, one on either side thereof, to loosely receive the lever between them.

I claim—

A float valve of the class described, comprising an inverted U shaped casing, one of the legs of the U being a supply inlet and the other leg an outlet, a pivot pin on the casing midway between said inlet and outlet, a lever fulcrumed on said pivot pin and movable in a vertical plane, one part of the lever extending under and beyond said outlet, a float above said casing loosely connected with the outer end of said lever, a valve member adjustably mounted on the lever to close said outlet when the lever is moved upwardly around said pivot, said adjustable mounting comprising a slot piercing said lever and disposed longitudinally therein, and a clamping bolt movable laterally in said slot and projected therethrough and connected with said valve member to clamp the latter in position.

In testimony whereof I affix my signature in presence of a witness.

BEN J. OLSON.

Witness:
GEORGE VOELKER.